H. H. CLAY, DEC'D.
J. B. CLAY, ADMINISTRATOR.
GATE STAY.
APPLICATION FILED DEC. 15, 1910.
1,044,351.
Patented Nov. 12, 1912.
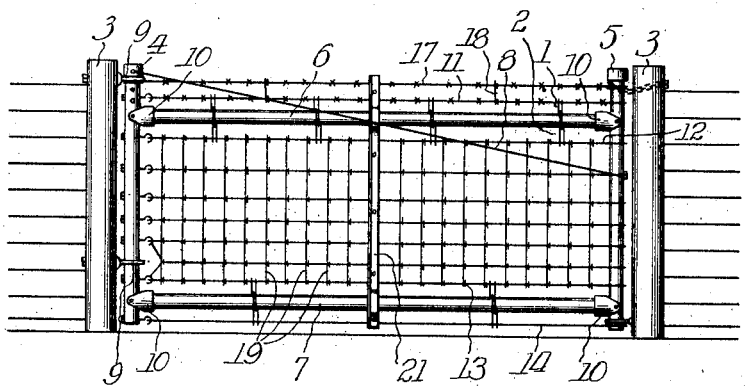
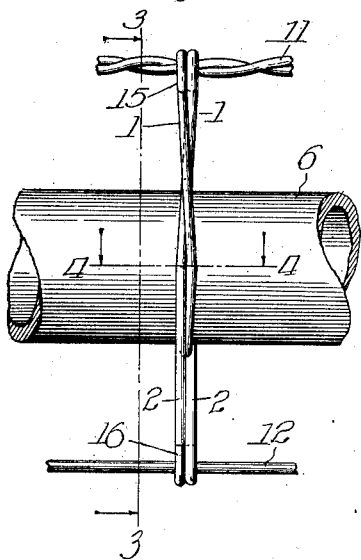
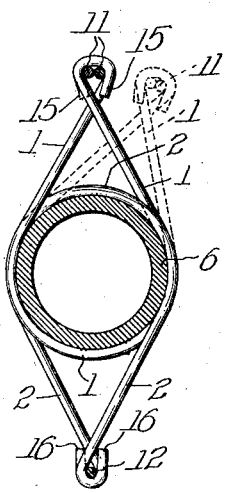
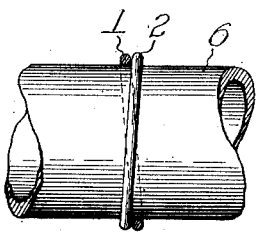
Witnesses:
Robert N. Weir
Charles J. Cobb
Inventor:
Henry H. Clay
By ——— Attys.

UNITED STATES PATENT OFFICE.

HENRY H. CLAY, OF CEDAR FALLS, IOWA; JOSEPH B. CLAY, OF CEDAR FALLS, IOWA, ADMINISTRATOR OF SAID HENRY H. CLAY, DECEASED, ASSIGNOR TO IOWA GATE COMPANY, OF CEDAR FALLS, IOWA, A CORPORATION OF IOWA.

GATE-STAY.

1,044,351. Specification of Letters Patent. Patented Nov. 12, 1912.

Application filed December 15, 1910. Serial No. 597,543.

*To all whom it may concern:*

Be it known that I, HENRY H. CLAY, a citizen of the United States, residing at Cedar Falls, in the county of Blackhawk and State of Iowa, have invented certain new and useful Improvements in Gate-Stays, of which the following is a description.

My invention belongs to that general class of devices known as gates or fences, and relates more particularly to a stay or fixture to be used on wire gates or fences for staying and maintaining the wire in position and preventing sagging.

My invention has among its objects the production of a stay of the kind described that is simple, durable, efficient and inexpensive, and that may be used wherever found applicable. It is easily applied to old gates or to new gates in the course of manufacture, and cannot be broken by stock rubbing down or bearing against it, or by sagging or displacement of the wires of the gate from other causes.

To this end my invention consists in the novel construction, arrangement and combination of parts herein shown and described, and more particularly pointed out in the claim.

In the drawings, wherein like reference characters indicate like or corresponding parts, Figure 1 is a front elevation of one style of gate with a plurality of stays or fixtures applied thereto. Fig. 2 is an enlarged side elevation of a portion of the same, showing a pair of stays. Fig. 3 is a sectional view taken substantially on line 3—3 of Fig. 2, and Fig. 4 is a top elevation of the bar 6 and the stay 2, the stay 1 being sectioned substantially on the line 4—4 of Fig. 2.

Referring to the drawings, in which a gate is shown provided with the desired number of stays 1 and 2, 3—3 represent the gate posts and 4, 5, 6 and 7 the gate frame. One end of the frame is suitably supported by one of the gate posts 3, as shown the end bar 4 is suitably supported by hinge parts 9 and carried by the gate post, the opposite end 5 of the gate being carried by a stay wire 8, extending from the end bar 4, the gate being what is known as a folding panel gate. The cross bars 6 and 7 are pivotally secured to the end bars 4 and 5 by hinge joints 10, or their equivalent, so that the free end of the frame may be raised and the end supported by adjusting the position of the stay wire 8 on the end bar 5.

On the gate shown the wires 11, 12, 13 and 14 are shown stayed by the stay wires 1 and 2, each stay comprising a loop with the ends crossed and then bent over and back to form loops through which wire passes. The loop 1 embraces the pipe or bar 6 with the ends crossed, and then bent back as at 15 to form two alined loops or eyes, through which the wires 11 are passed. Where there is no wire on the opposite side of the bar 6 to be stayed, one loop is sufficient, but where there is a wire on the opposite side, as for example, wire 12, I also stay the same by providing a loop 2, which is formed substantially similar to the loop 1. The stay wires 1 and 2 for the lower bar 7 and wires 13 and 14 are substantially similar and need no further description.

Where the two loops are used I preferably cross the same, as most clearly shown in Figs. 2, 3 and 4, so that one of them maintains the other against displacement along the bar. Referring particularly to the figures mentioned, the stay 1 is looped over the wires 11 and then passes down under the bar 6, thence to the opposite side of the wires 11 and the end then bent to embrace the wire. The stay 2 is similarly looped, and it will be noticed by reference to Fig. 2, that they practically lock each other on the bar 6. When the wires 11 or 12, or 13 and 14, are pushed down or displaced, as for example as illustrated by the displacement of the wires 11 shown in the dotted lines in Fig. 3, the stay pivots about the bar without bending or breaking. The ends 15 and 16 may be bent entirely back to contact with the main part of the loop, if desired, but owing to the crossing of the ends as shown, this is not absolutely necessary. It will be noted that when two stays are used together, each one may pivot about the bar independently of the other without strain on the one not moved, or they may be both displaced toward the same side of the bar without strain or bending. By the employment of the stays described the wires of the fence or gate are maintained in place. In use the wire loops may be made in any suitable way, and then snapped on the completed gate, and after positioning, they cannot be easily removed except by cutting or bending entirely out of shape. Additional stays from those shown may, of course, be provided. The stays may be used regardless of the kind of wire on the fence or gate, the same serving to stay the fabric 19, as well as wires 11 and 14. It is, of course, obvious that an additional strut or brace 21, or the equivalent for the wires and gate, may be employed if desired.

Having thus described my invention, it is obvious that various immaterial modifications may be made in the same without departing from the spirit of my invention, hence I do not wish to be understood as limiting myself to the exact form, arrangement, construction or combination of parts herein shown and described, or uses mentioned.

What I claim as new and desire to secure by Letters Patent is:—

In a gate, a rigid bar, a wire on each side thereof parallel therewith and connecting means between the bar and wires including oppositely disposed substantially U-shaped retaining devices, the bases of which U-shaped devices interlock and loosely engage over the bar in opposite directions whereby to prevent longitudinal movement of the devices on the bar while permitting a slight rocking movement on said bar, and the opposite arms of which devices being crossed at their upper ends and bent backward in opposite directions and loosely engaging over the adjacent wire.

In testimony whereof, I have hereunto signed my name in the presence of two subscribing witnesses.

HENRY H. CLAY.

Witnesses:
 W. N. HASTROP,
 C. A. WISE.

Copies of this patent may be obtained for five cents each, by addressing the "Commissioner of Patents, Washington, D. C."